United States Patent [19]

Snedden et al.

[11] Patent Number: 5,693,118
[45] Date of Patent: Dec. 2, 1997

[54] APPARATUS FOR MAKING GLASS FIBERS HAVING VACUUM COOLING FANS

[75] Inventors: Andrew L. Snedden, Mt. Perry; David H. Wolf, Newark, both of Ohio

[73] Assignee: Owens-Corning Fiberglas Technology Inc, Summit, Ill.

[21] Appl. No.: 652,043

[22] Filed: May 23, 1996

[51] Int. Cl.⁶ .................................................. C03B 37/022
[52] U.S. Cl. .................................. 65/511; 65/532; 65/355
[58] Field of Search .......................... 65/498, 511, 532, 65/481, 355

[56] References Cited

U.S. PATENT DOCUMENTS

| | | |
|---|---|---|
| Re. 24,060 | 9/1955 | Russell . |
| 2,706,365 | 4/1955 | Stalego . |
| 2,947,028 | 8/1960 | Slayter . |
| 3,082,615 | 3/1963 | Alvarez De Toledo . |
| 3,150,946 | 9/1964 | Russell . |
| 3,256,078 | 6/1966 | Drummond . |
| 3,278,282 | 10/1966 | Jaray . |
| 3,345,147 | 10/1967 | Russell . |
| 3,468,643 | 9/1969 | Stalego et al. . |
| 3,746,525 | 7/1973 | Kesaharukasuga et al. . |
| 3,775,074 | 11/1973 | Russell . |
| 4,050,916 | 9/1977 | Russell . |
| 4,118,210 | 10/1978 | Watanabe .................. 65/481 |
| 4,197,103 | 4/1980 | Ishikawa et al. . |
| 4,214,884 | 7/1980 | Martin, Jr. . |
| 4,227,906 | 10/1980 | Rieser ........................ 65/481 |
| 4,310,602 | 1/1982 | Martin, Jr. . |
| 4,332,602 | 6/1982 | Jensen . |
| 4,337,075 | 6/1982 | Mechel et al. . |
| 4,363,645 | 12/1982 | Eisenberg ................... 65/481 |
| 4,421,538 | 12/1983 | Demaschquie . |
| 4,541,853 | 9/1985 | Sullivan . |
| 4,566,890 | 1/1986 | Hostler et al. . |
| 4,571,251 | 2/1986 | Sullivan et al. . |
| 4,662,922 | 5/1987 | Hill et al. . |
| 5,002,598 | 3/1991 | Lecron et al. . |
| 5,160,359 | 11/1992 | Strackenbrock ............ 65/481 |
| 5,244,483 | 9/1993 | Brosch et al. . |

Primary Examiner—John Hoffmann
Attorney, Agent, or Firm—C. Michael Gegenheimer; Inger H. Eckert

[57] ABSTRACT

An apparatus (10) is provided for producing continuous glass filaments (30). The apparatus (10) comprises a bushing (20) for supplying streams of molten glass and a drawing device (40) adapted to draw the streams into continuous glass filaments (30). A cooling device (50) is also provided and is located adjacent to the bushing (20) for drawing in heated air from a filament forming area beneath the bushing such that heat is convectively transferred away from the filament forming area.

20 Claims, 8 Drawing Sheets

FIG. 10 ures, 5,693,118

APPARATUS FOR MAKING GLASS FIBERS HAVING VACUUM COOLING FANS

TECHNICAL FIELD

This invention relates generally to apparatuses for producing continuous glass filaments and, more particularly, to such an apparatus having a bushing and a cooling device positioned beneath the bushing for drawing in heated air from a filament forming area beneath the bushing such that heat is transferred away from the filament forming area.

BACKGROUND ART

Apparatuses for transferring heat from a filament forming area beneath a bushing are known in the art. Such an apparatus typically comprises a plurality of solid cooling fins which extend between rows of bushing tips or nozzles. The fins may be cantilevered from a single water-cooled manifold or may be secured at their ends to a pair of water-cooled manifolds. Heat from the glass is radiantly and convectively transferred to the fins as the glass flows from the tips or nozzles and is drawn into free continuous filaments. The heat then moves conductively through the fins to the water-cooled manifolds.

It would be desirable to have a system which removes a greater amount of heat from a filament forming area beneath a bushing than conventional solid cooling fin/water-cooled manifold systems. If a greater amount of energy in the form of heat is more rapidly removed from the filament forming area, the temperature of the bushing and the glass in the bushing can be increased which allows throughput to be increased. Accordingly, there is a need for improved apparatus for transferring heat away from a filament forming area beneath a bushing.

DISCLOSURE OF INVENTION

This need is met by the present invention, whereby an improved apparatus is provided for accelerating the convective cooling of glass as it flows from nozzles in a bushing and is drawn into fine continuous filaments. The apparatus includes a plurality of hollow fins which extend into the filament forming area. Each fin has a plurality of openings through which heated air is uniformly withdrawn from the filament forming area. As the heated air is removed, an upflow of cool air from the calm open air below quickly replaces the heated air and serves to convectively cool the glass as it flows from the bushing nozzles and is attenuated into filaments. The cool air further serves to cool the bottom bushing plate. Heat is also radiantly transferred from the glass and the bushing to the fins.

The cooling device of the present invention is believed to convectively transfer a much greater amount of heat away from a filament forming area and with superior uniformity at any locality from beneath a bushing than typical prior art solid fin/water-cooled manifold systems. As a result, the temperature of the molten glass within the bushing can be increased, e.g., the molten glass temperature can be increased by about 100° F. above normally maintained temperatures. This yields increased throughput rates. Higher molten glass temperatures also reduce the likelihood that devitrified crystals may form within the glass delivery system, e.g., in a forehearth or delivery channel, which can migrate to the bushing and cause fiber breakage resulting in a shut-down of the filament forming operation. It is also believed that the cooling device increases the convective cooling of the lower bushing plate including the nozzles in that plate. This results in a reduction of the temperature of the glass exiting the bushing nozzles since the glass, as it flows through the nozzles, is progressively cooled by the air quenched bushing nozzles. Hence, the temperature of the glass flowing out of the bushing tips is reduced thus reducing the amount of additional heat that must be transferred from the glass as it is being attenuated into filaments.

In accordance with a first aspect of the present invention, an apparatus is provided for producing continuous glass filaments. The apparatus comprises a bushing for supplying streams of molten glass and a drawing device adapted to draw the streams into continuous glass filaments. A cooling device is also provided and is located adjacent to the bushing for drawing in heated air from a filament forming area beneath the bushing such that heat is convectively transferred away from the filament forming area.

The cooling device comprises at least one fin having an outer surface, an interior cavity and at least one orifice which extends from the outer surface to the interior cavity. The fin extends into the filament forming area. A vacuum manifold is coupled to the fin for communication therewith. The manifold is adapted to communicate with a vacuum source such that heated air is drawn away from the filament forming area through the fin and the manifold.

The fin includes a plurality of orifices spaced along its length. In accordance with one embodiment of the present invention, the orifices are equally spaced apart from one another along the length of the fin.

The fin has distal and proximal ends with the proximal end being positioned adjacent to the manifold. In accordance with a second embodiment of the present invention, at least two of the orifices are located adjacent to the proximal end and spaced apart by a first distance and at least two of the orifices are located adjacent to the distal end and spaced apart by a second distance which is less than the first distance.

In accordance with another embodiment of the present invention, the orifices are of generally equal diameter.

In accordance with a further embodiment of the present invention, at least one of the orifices is located adjacent to the proximal end and has a first diameter and at least one of the orifices is located adjacent to the distal end and has a second diameter which is greater than the first diameter.

Preferably, the cooling device comprises a plurality of fins, each having an outer surface, an interior cavity and at least one orifice which extends from the outer surface to the interior cavity.

In accordance with a second aspect of the present invention, a cooling device is provided which is located adjacent to a bushing. The bushing supplies streams of molten glass to be drawn into continuous glass filaments. The cooling device draws in heated air from a filament forming area beneath the bushing such that an upflow of air is generated which convectively transfers heat away from the filament forming area.

The cooling device comprises at least one fin having an outer surface, an interior cavity and at least one orifice which extends from the outer surface to the interior cavity. The fin extends into the filament forming area. A vacuum manifold is coupled to the fin for communication therewith. The manifold is adapted to communicate with the vacuum source such that heated air is drawn away from the filament forming area through the fin and the manifold.

Accordingly, it is an object of the present invention to provide an apparatus for producing continuous glass filaments having an improved cooling device. It is also an object of the present invention to provide a cooling device having at least one hollow fin through which heated air is withdrawn. These and other objects of the present invention will be apparent from the following description, the accompanying drawings and the appended claims.

MODES FOR CARRYING OUT THE INVENTION

Figure 1:
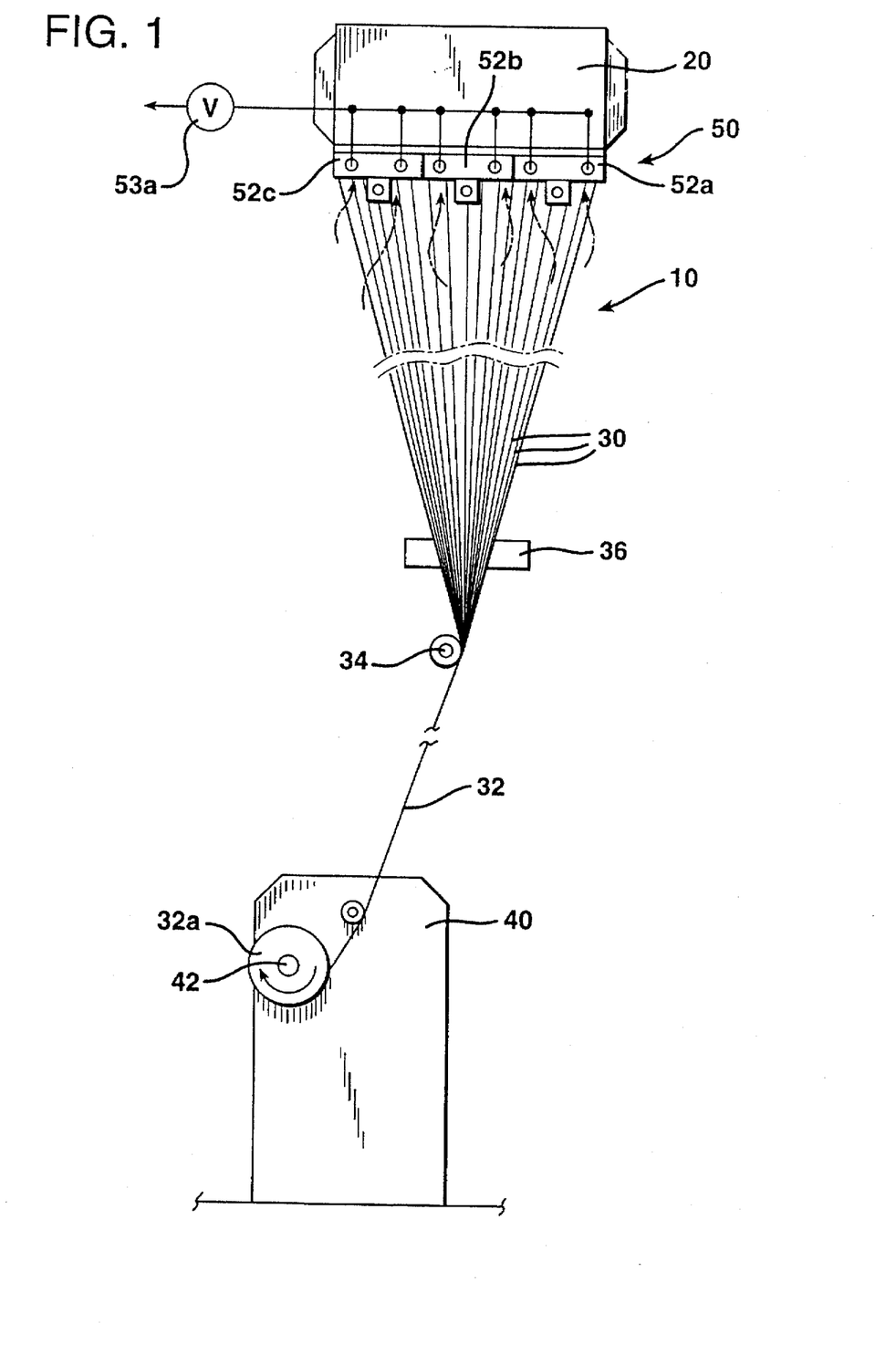
FIG. 1 is a front view of an apparatus constructed in accordance with the present invention for producing continuous glass filaments.
Figure 7:
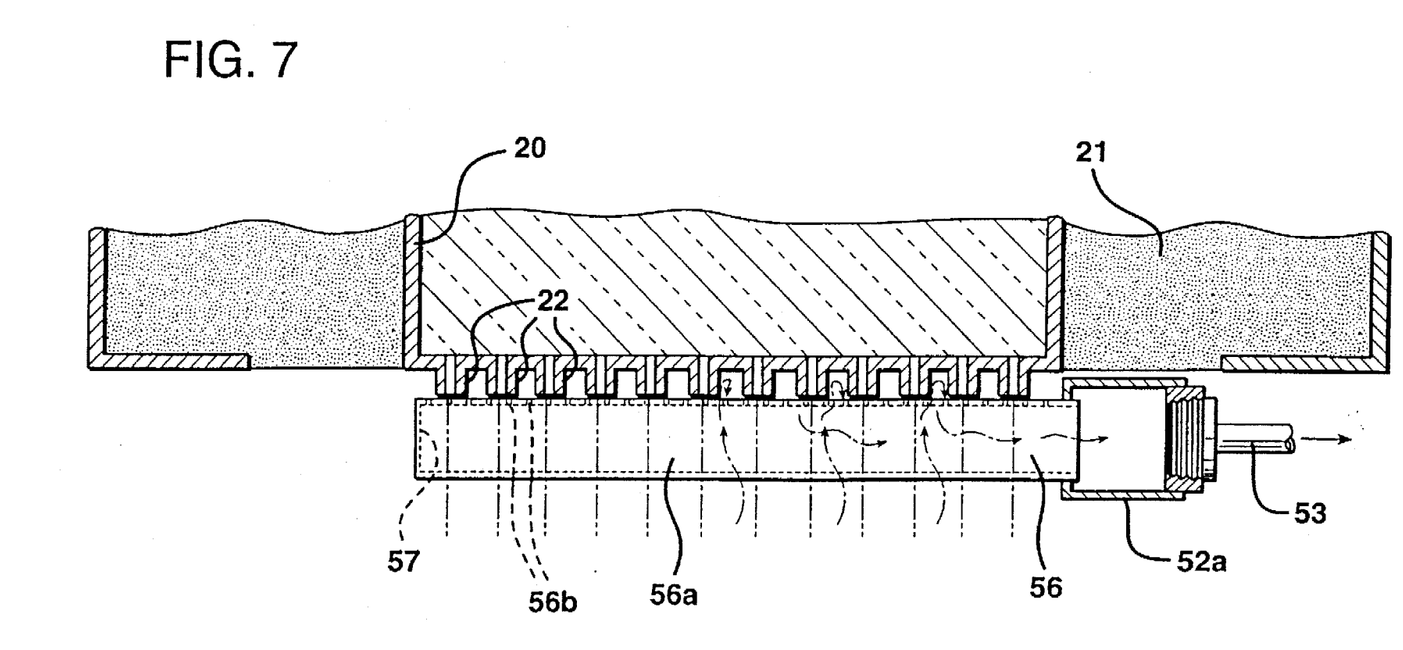
FIG. 7 is a cross-sectional view taken through a portion of the bushing and cooling device of the apparatus illustrated in FIG. 4.

An apparatus 10 constructed in accordance with the present invention for producing continuous glass filaments is illustrated in FIG. 1. The apparatus 10 includes a bushing 20 which is encased in refractory material 21, see FIG. 7. The bushing 20 is provided with a plurality of nozzles or tips 22 through which streams of molten glass are discharged, see FIGS. 1 and 5. The streams of glass are mechanically drawn to form continuous filaments 30 via a winder device 40. In the illustrated embodiment, the filaments 30 are gathered into a continuous strand 32 at gathering roller 34, after having received a protective coating or sizing composition from sizing applicator 36. The strand 32 is wound onto a rotating collet 42 of winder device 40 to form a package 32a.

The apparatus 10 further includes a cooling device 50 located in a filament forming area just below the bushing 20 for drawing in heated air from the filament forming area such that heat is transferred away from said filament forming area. Quenching of the glass must occur in a timely manner for glass filaments to be formed. If the cooling rate of the glass is too low, breakage of the glass will eventually occur causing a shut-down in the filament forming process.

Figure 4:
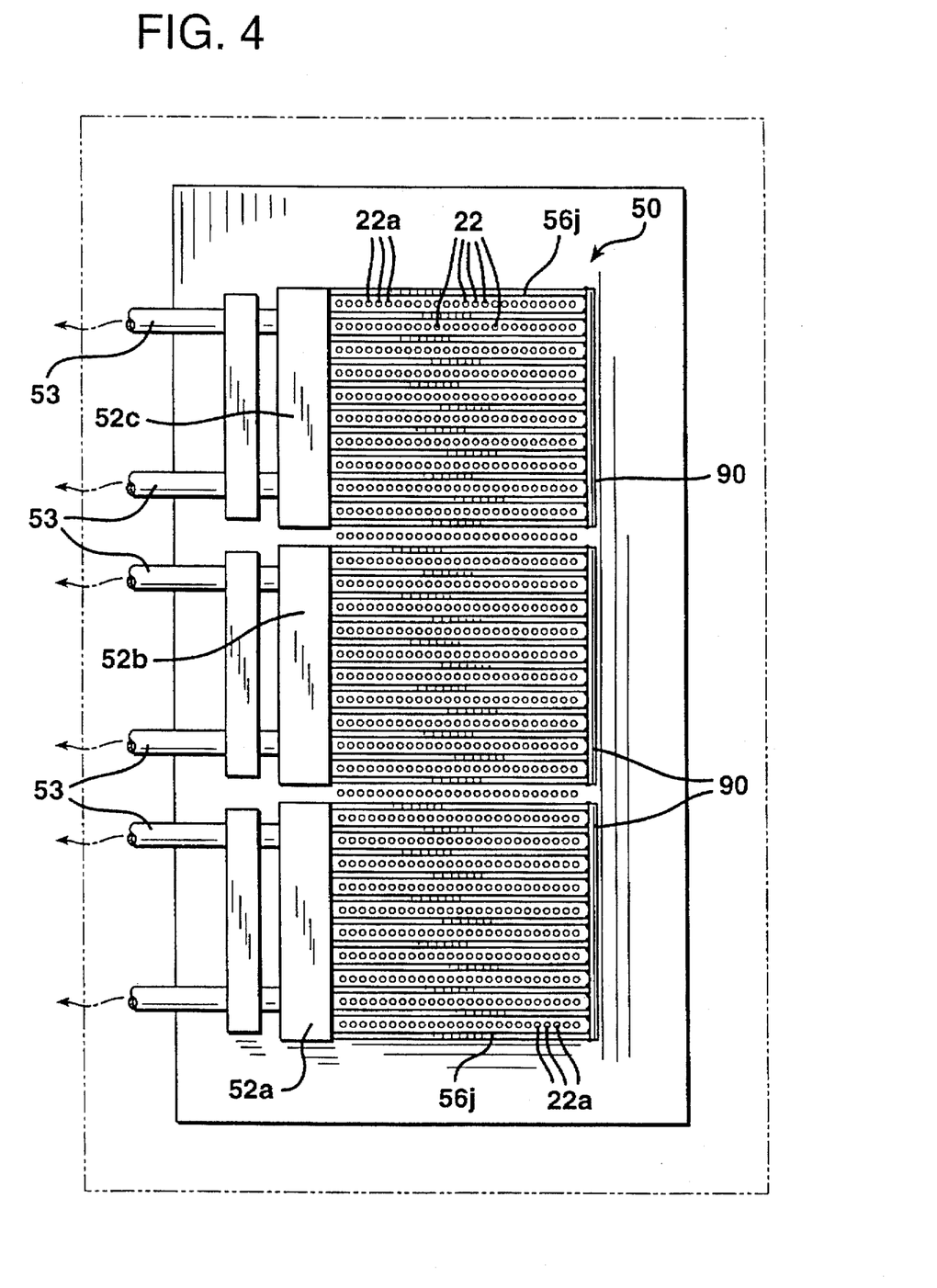
FIG. 4 is a view of the underside of the bushing and cooling device of FIGS. 1, 2 and 3.

In the embodiment illustrated in FIGS. 1 and 4, the cooling device 50 includes a plurality of first manifolds 52a–52c and a plurality of first cooling fins 56 which extend into the filament forming area. The fins 56 are positioned between rows of the bushing tips 22. In the illustrated embodiment, a single row of bushing tips 22 is located between each set of adjacent fins 56. It is also contemplated that two or more rows of bushing tips 22 may be located between each set of adjacent fins 56.

Figure 5:
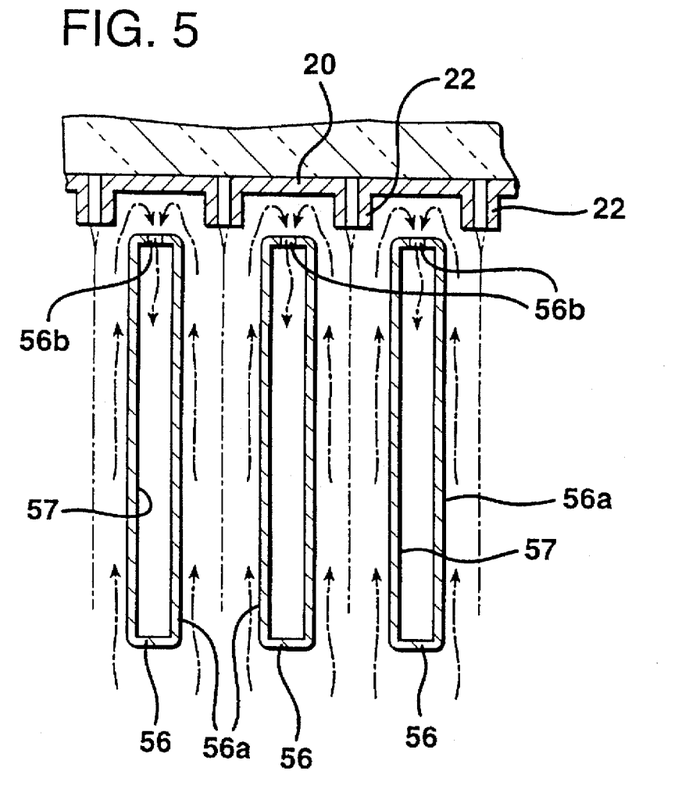
FIG. 5 is a cross-sectional view of three fins and a portion of the bushing of the apparatus of FIG. 1.
Figure 6:
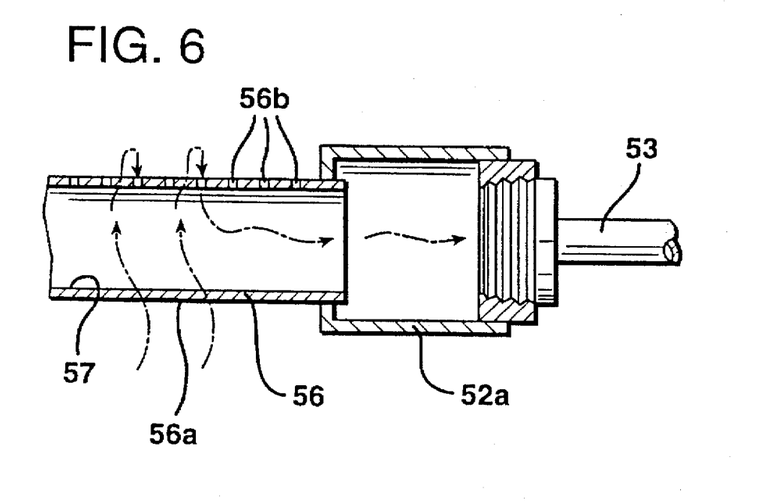
FIG. 6 is a cross-sectional view of a portion of a fin and a portion of the manifold of the apparatus of FIGS. 1 and 2.

Each fin 56 has an outer surface 56a, an interior cavity 57 and a plurality of orifices 56b which extend from the outer surface 56a to the interior cavity 57, see FIGS. 5 and 6. The fins 56 are welded or otherwise coupled to the vacuum manifolds 52a–52c for communication therewith. The manifolds 52a–52c, in turn, communicate with a vacuum source 53a via hoses 53 such that heated air is drawn away from the filament forming area through the fins 56 and the manifolds 52a–52c.

Figure 2:
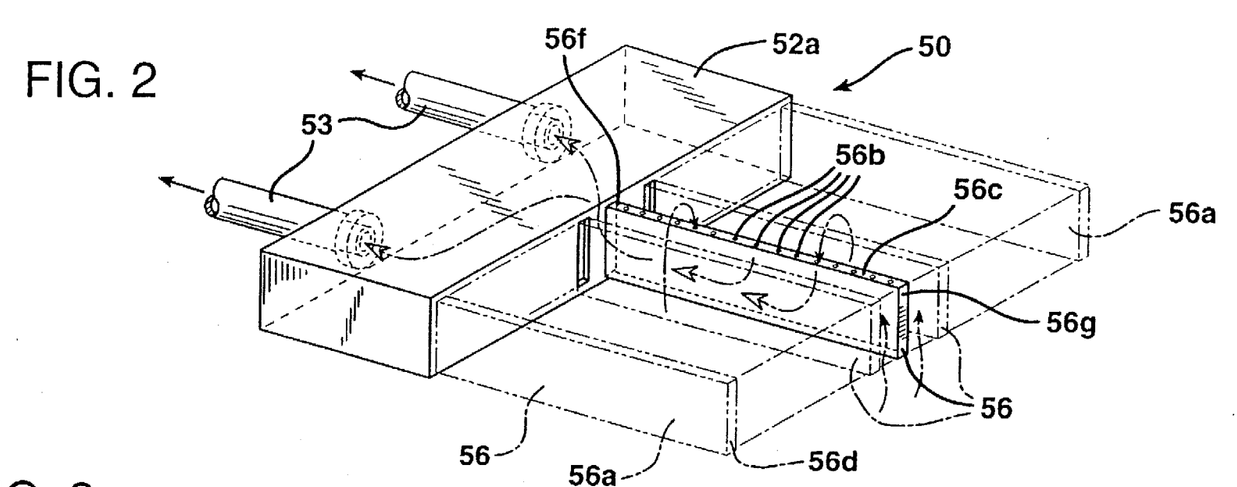
FIG. 2 is a perspective view showing a manifold and a plurality of hollow fins having orifices provided in their upper surfaces.
Figure 3:
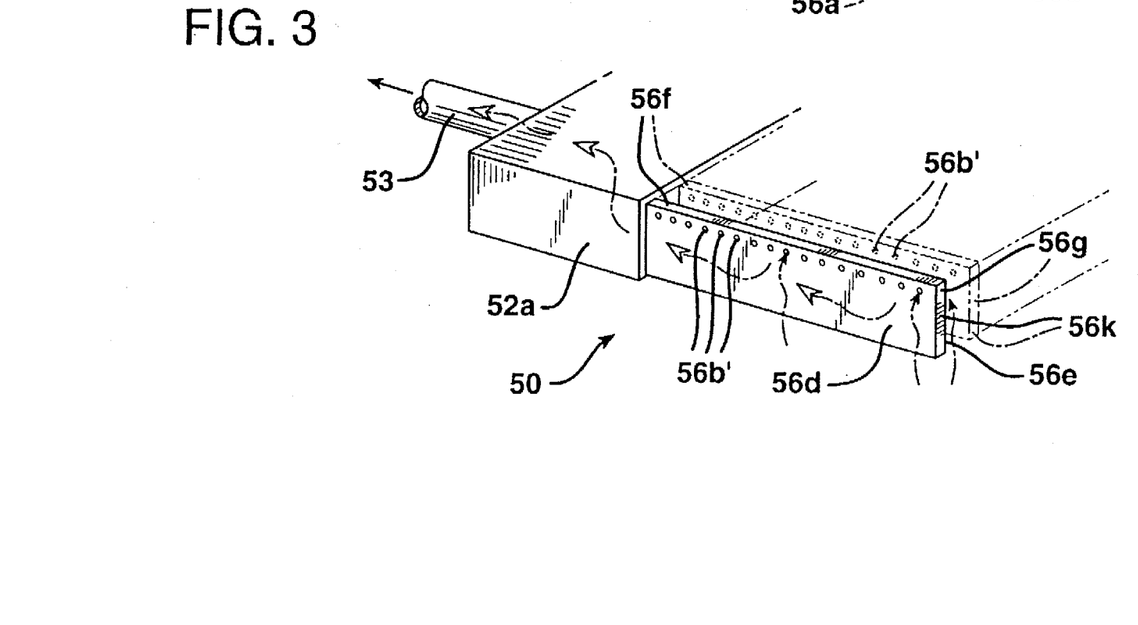
FIG. 3 is a perspective view showing a manifold and a plurality of hollow fins having orifices in their side surfaces.

The orifices 56b may extend along a top surface 56c of each fin 56 as shown in FIG. 2. Alternatively, separate rows of orifices 56b' may be provided along one or both of opposing side surfaces 56d and 56e of the fins 56, see FIG. 3. The orifices 56b may also be located on a bottom fin surface or on two or more fin surfaces.

In the embodiment illustrated in FIG. 2, the orifices 56b are equally spaced apart from one another along the length of each fin 56. The orifices 56b are also of generally equal diameter.

Each fin 56 has proximal and distal ends 56f and 56g, see FIG. 2. While not shown in the drawings, the orifices 56b may be spaced from one another such that the length between any two adjacent orifices 56b near the proximal end 56f is greater than the length between any two adjacent orifices 56b near the distal end 56g. It is further contemplated that the orifices 56b may have different diameters. It is also contemplated that an orifice 56b located near the proximal end 56f may have a diameter which is less than the diameter of an orifice 56b located near the distal end 56g.

As noted previously, the manifolds 52a–52c communicate with a vacuum source 53a such that heated air is drawn away from the filament forming area through the fins 56 and the manifolds 52a–52c, see FIGS. 1, 2, 5 and 6. As the heated air is removed by the fins 56, an upflow of cool air replaces the heated air and serves to convectively cool the glass as it flows from the bushing nozzles 22 and is attenuated into filaments 30. The cool air further serves to cool the nozzles 22 in the bottom bushing plate. Heat is also radiantly transferred from the glass and the bushing 20 to the fins 56.

While not shown in the drawings, it is further contemplated that each of the outermost manifolds 52a and 52c may have an additional fin (not shown) connected thereto which is positioned adjacent to its outermost fin 56j. Thus, no nozzles 22 would be located between each additional fin and its adjacent fin 56j. It is believed that the additional fins will improve the uniformity of the cooling of the outermost bushing nozzles 22a and the filaments 30 attenuated from glass flowing through those nozzles 22a.

It is further contemplated that a metal bracing rod or strip 90 may be welded or otherwise connected to the end faces 56k of the fins 56 so as to prevent fin warping and/or bowing, i.e., to maintain desired spacing between adjacent fins 56, see FIG. 4. Alternatively, or in combination with adding rods 90 to the fins 56, the manifolds 52a–52c and their corresponding fins 56 may undergo a stress relief operation to prevent warping and/or bowing. A further benefit to such an operation is that the metal manifolds 52a–52c and fins 56 are significantly darkened during the operation making the manifolds 52a–52c and fins 56c better absorbers of radiant heat.

Figure 8:
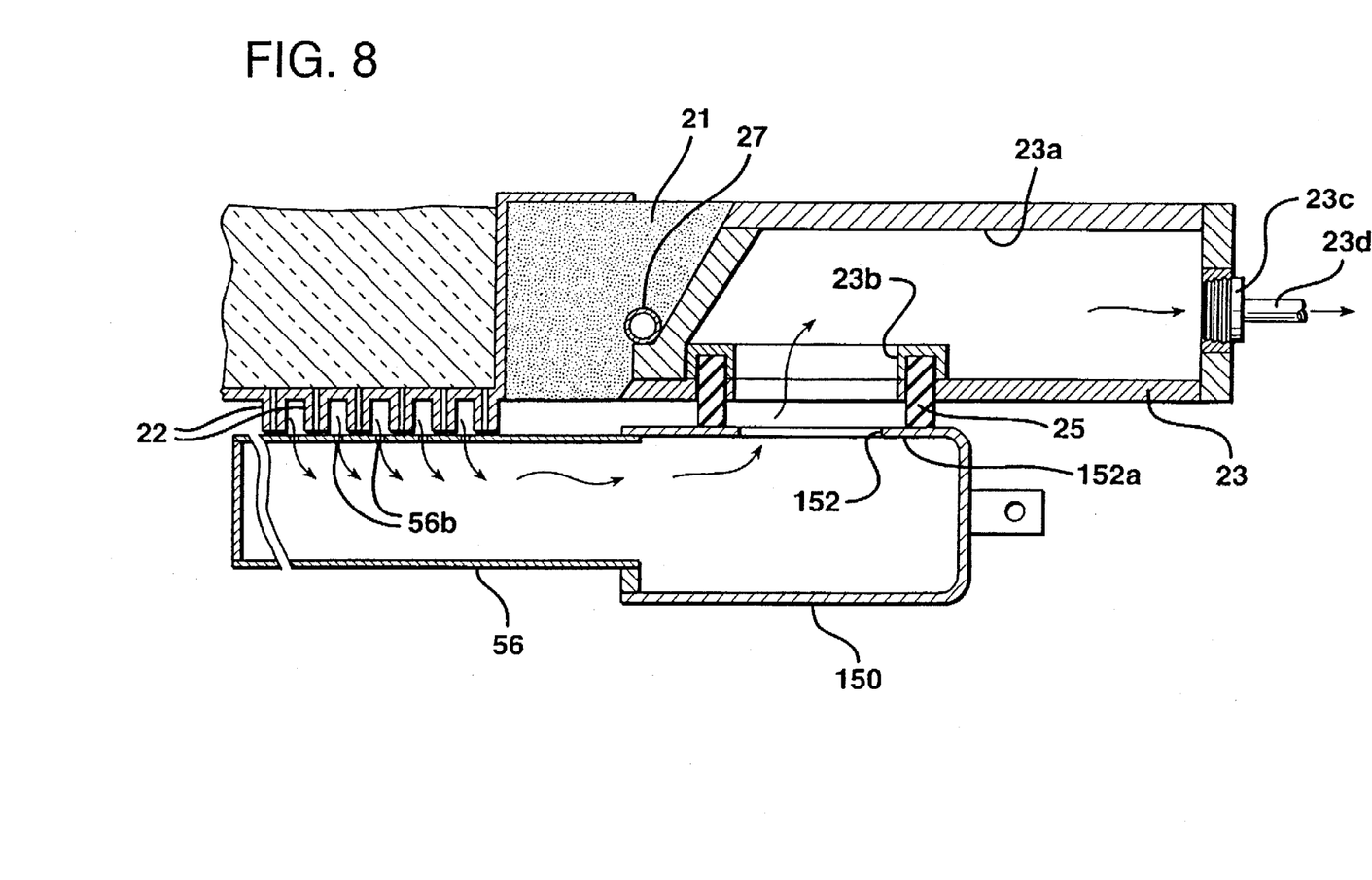
FIG. 8 is a cross-sectional view of a portion of a modified cooling device of the present invention.

In an alternative embodiment illustrated in FIG. 8, the fins 56 are weldably or otherwise connected to a modified fin manifold 150 so as to communicate therewith. The fin manifold 150 is provided with one or more openings 152 in its top surface 152a.

The bushing 20 illustrated in FIG. 8 is surrounded by refractory material 21 which, in turn, is supported by a frame 23 constructed from a metallic material, such as stainless steel. The frame 23 defines a bushing manifold 23a having one or more openings 23b which are positioned so as to be in alignment with openings 152 when the fin manifold 150 is secured in position below the frame 23. Interposed between each set of openings 152 and 23b is a polymeric seal ring 25 which allows the bushing manifold 23a to communicate with the fin manifold 150. The bushing manifold 23a also communicates with a vacuum source (not shown) via fitting 23c and hose 23d such that heated air is pulled from the fiber forming area beneath the bushing 20 through the fins 56 and the manifolds 150 and 23a. Positioned adjacent to the frame 23 is a cooling coil 27.

Figure 9:
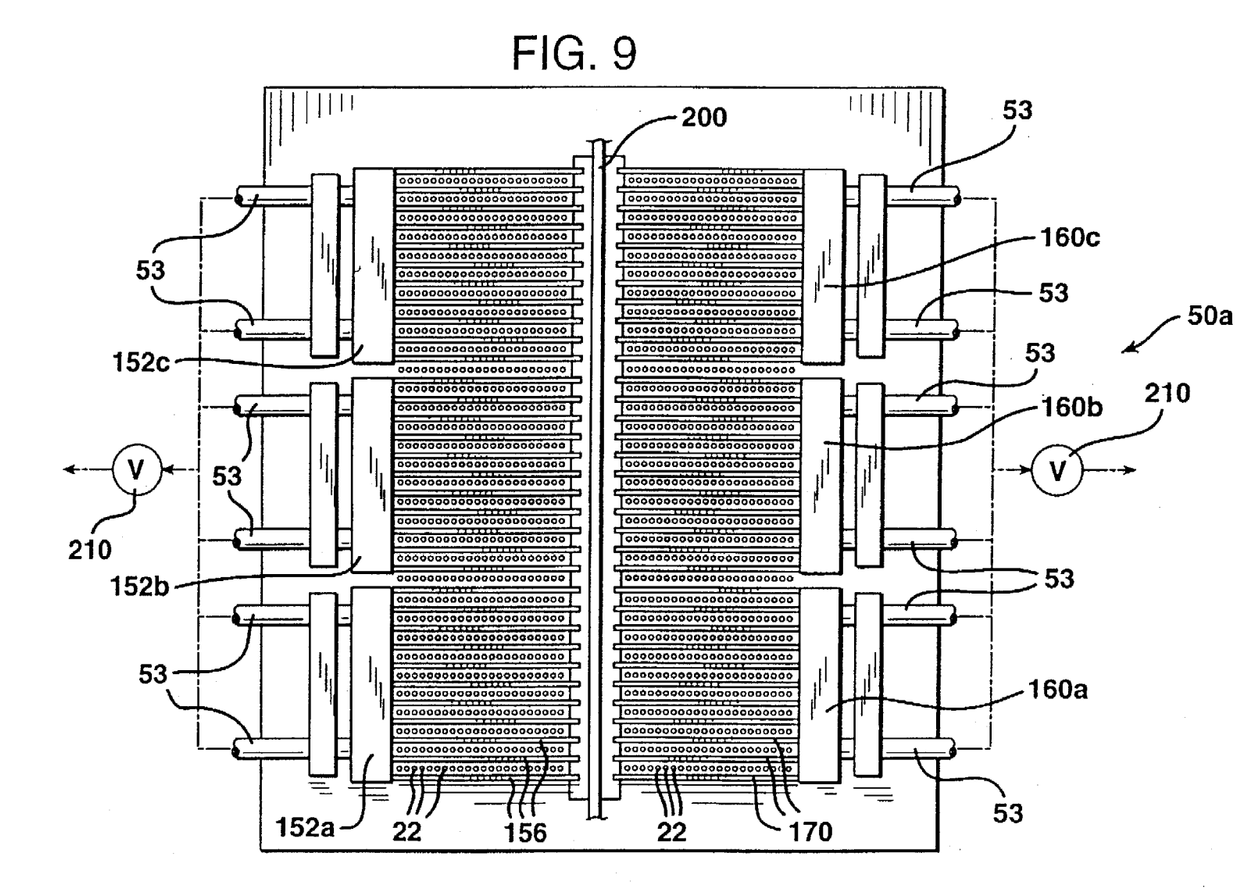
FIG. 9 is a view of the underside of a bushing and modified cooling device of the present invention.
Figure 10:
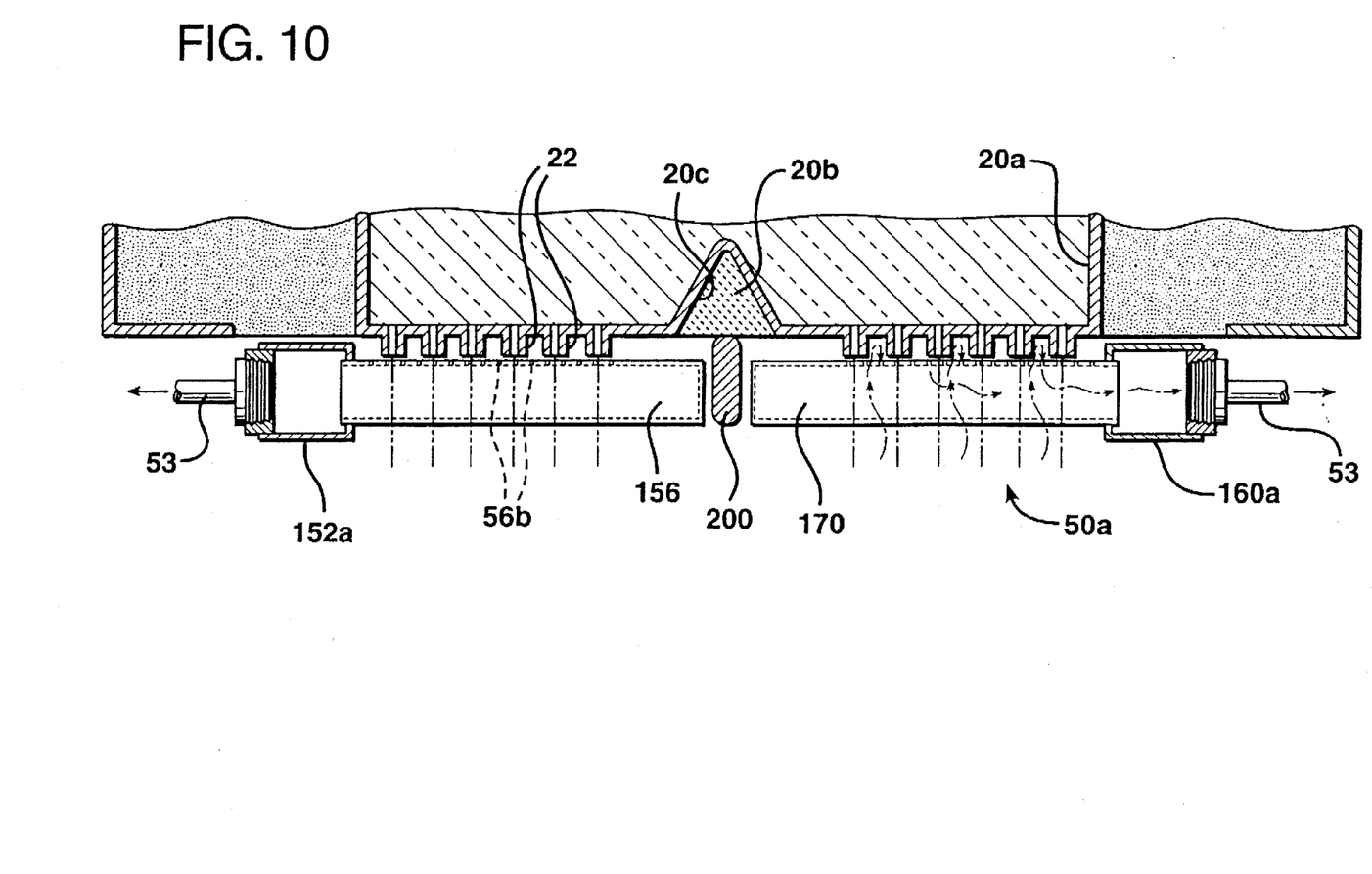
FIG. 10 is a cross-sectional view taken through a portion of the bushing and cooling device illustrated in FIG. 9.

In the event that a double bottom bushing 20a is provided, such as shown in FIGS. 9 and 10, a further embodiment of the heat removal apparatus 50a is provided which includes first manifolds 152a–152c and first cooling fins 156, which are constructed in essentially the same manner as manifolds 52a–52c and fins 56 illustrated in FIGS. 2–6. The heat removal apparatus 50a further includes a plurality of second manifolds 160a–160c and a plurality of second fins 170. The first and second cooling fins 156 and 170 extend into the filament forming area and are positioned on opposite sides of a bushing support member 200. The bushing support member 200 contacts refractory material 20b which extends along a central groove 20c of the bushing 20a to support the bushing 20a, see FIG. 10. The fins 156 and 170 are positioned between rows of the bushing tips 22. In this illustrated embodiment, a single row of bushing tips 22 is located between each set of adjacent fins 156 and 170. It is also contemplated that two or more rows of bushing tips 22 may be located between each set of adjacent fins 156 and 170.

Each fin 156 and 170 is constructed in essentially the same manner as fins 56 discussed above. Thus, each fin has a plurality of orifices 56b which may be positioned along the length of each fin 156 and 170 in the same manner that the orifices 56b are positioned along the length of each fin 56, as described above. The fins 156 and 170 are welded or otherwise coupled to the vacuum manifolds 152a–152c and 160a–160c for communication therewith. The manifolds 152a–152c and 160a–160c communicate with vacuum sources 210 via hoses 53 such that heated air is drawn away from the filament forming area through the fins 156 and 170 and the manifolds 152a–152c and 160a–160c.

Vacuum source 53a and vacuum sources 210 may comprise any one of a number of commercially available vacuums. Preferably, the vacuum sources 53a and 210 draw in air through the fins and the manifolds at a rate sufficient to generate air upflow velocities which are adequate to effect acceptable cooling of the fiber forming area including the glass flowing from the bushing. This should result in the manifolds 52a–52c, 152a–152c, 160a–160c having an internal pressure falling within a range of approximately 0 to −14.7 psig (0 to −101.4 kPa gauge).

The cooling device of the present invention is believed to convectively transfer a much greater amount of heat away from a filament forming area beneath a bushing than typical prior art solid fin/water-cooled manifold systems. As a result, the temperature of the molten glass within the bushing can be increased, e.g., the molten glass temperature can be increased above normally maintained temperatures by about 100° F. This yields increased throughput rates. Higher molten glass temperatures also reduce the likelihood that devitrified crystals will form within the glass delivery system, e.g., in a forehearth or delivery channel, which can migrate to the bushing and cause fiber breakage resulting in a shut-down in the filament forming operation. It is also believed that the cooling device increases the convective cooling rate of the lower bushing plate including the nozzles in that plate. This results in a reduction of the temperature of the glass exiting the bushing nozzles since the glass, as it flows through the nozzles, is progressively cooled by the air quenched bushing nozzles. Hence, the temperature of the glass flowing out of the bushing tips is reduced, thus reducing the amount of additional heat that must be transferred from the glass as it is being attenuated into filaments.

Having described the invention in detail and by reference to preferred embodiments thereof, it will be apparent that modifications and variations are possible without departing from the scope of the invention defined in the appended claims. For example, it is further contemplated that a device for spraying a water mist onto the filaments could be positioned below the bushing. The water mist would be pulled upwardly with the cool air as the cool air replaces the heated air withdrawn by the fins 56 and, as such, would farther enhance the cooling of the filaments 30 and the bushing 20.

It is additionally contemplated that the cooling device may comprise a plurality of fins and first and second manifolds spaced apart from one another so as to be positioned adjacent to opposite ends of the fins. In this cooling device, the first vacuum manifold communicates with first ends of the fins and the second vacuum manifold communicates with second opposing ends of the same fins so as to draw heated air away from the filament forming area beneath a bushing. Such a cooling device could be used with either a single or double bottom bushing.

We claim:

1. An apparatus for producing continuous glass filaments comprising:

a bushing for supplying streams of molten glass to be drawn into continuous filaments;

a drawing device for drawing said streams into said filaments; and, a cooling device located adjacent to said bushing for drawing in heated air from a filament forming area beneath said bushing such that heat is convectively transferred from said filament forming area, said cooling device including a vacuum source and at least one fin which communicates with said vacuum source and has an outer surface, an interior cavity and at least one orifice which extends from said outer surface to said interior cavity, said at least one fin extending into said filament forming area.

2. An apparatus as set forth in claim 1, wherein said cooling device further comprises:

a vacuum manifold coupled to said fin for communication therewith, said manifold communicating with said vacuum source such that heated air is drawn away from said filament forming area through said fin and said manifold.

3. An apparatus as set forth in claim 2, wherein said at least one orifice in said at least one fin comprises a plurality of orifices.

4. An apparatus as set forth in claim 3, wherein said orifices are equally spaced apart from one another along the length of said fin.

5. An apparatus as set forth in claim 3, wherein said fin has distal and proximal ends with said proximal end being positioned adjacent to said manifold, two of said plurality of orifices being located adjacent to said proximal end and spaced apart by a first distance and another two of said plurality of orifices being located adjacent to said distal end and spaced apart by a second distance which is less than said first distance.

6. An apparatus as set forth in claim 3, wherein said plurality of orifices are of generally equal diameter.

7. An apparatus as set forth in claim 3, wherein said fin has distal and proximal ends with said proximal end being positioned adjacent to said manifold, one of said plurality of orifices being located adjacent to said proximal end and having a first diameter and another one of said plurality of orifices being located adjacent to said distal end and having a second disinter which is greater than said first diameter.

8. An apparatus as set forth in claim 2, wherein said at least one fin comprises a plurality of fins each having an outer surface, an interior cavity and at least one orifice which extends from said outer surface to said interior cavity, said fins extending into said filament forming area and being coupled to said manifold for communication therewith such that the heated air is drawn away from said filament forming area through said fins and said manifold.

9. An apparatus as set forth in claim 8, wherein each of said plurality of fins includes a plurality of orifices spaced along its length.

10. An apparatus as set forth in claim 9, wherein said plurality of orifices along the length of each of said fins are equally spaced apart from one another.

11. An apparatus as set forth in claim 9, wherein said plurality of orifices on each of said plurality of fins are of generally equal diameter.

12. A cooling device located adjacent to a bushing for supplying streams of molten glass to be drawn into continuous filaments, said cooling device comprising a vacuum source and at least one fin which communicates with said vacuum source, said at least one fin having an outer surface, an interior cavity and at least one orifice which extends from said outer surface to said interior cavity, said at least one fin extending into a filament forming area beneath said bushing and drawing in heated air from said filament forming area beneath said bushing such that heat is transferred away from said filament forming area.

13. A cooling device as set forth in claim 12, wherein said cooling device further comprises:

a vacuum manifold coupled to said fin for communication therewith, said manifold communicating with said vacuum source such that heated air is drawn away from said filament forming area through said fin and said manifold.

14. A cooling device as set forth in claim 13, wherein said at least one orifice in said at least one fin comprises a plurality of orifices.

15. A cooling device as set forth in claim 14, wherein said orifices are equally spaced apart from one another along the length of said fin.

16. A cooling device as set forth in claim 14, wherein said fin has distal and proximal ends with said proximal end being positioned adjacent to said manifold, two of said plurality of orifices being located adjacent to said proximal end and spaced apart by a first distance and another two of said plurality of orifices being located adjacent to said distal end and spaced apart by a second distance which is less than said first distance.

17. A cooling device as set forth in claim 14, wherein said plurality of orifices are of generally equal diameter.

18. A cooling device as set forth in claim 14, wherein said fin has distal and proximal ends with said proximal end being positioned adjacent to said manifold, one of said plurality of orifices being located adjacent to said proximal end and having a first diameter and another one of said plurality of orifices being located adjacent to said distal end and having a second diameter which is greater than said first diameter.

19. A cooling device as set forth in claim 13, wherein said at least one fin comprises a plurality of fins each having an outer surface, an interior cavity and at least one orifice which extends from said outer surface to said interior cavity, said fins extending into said filament forming area and being coupled to said manifold for communication therewith such that the heated air is drawn away from said filament forming area through said fins and said manifold.

20. A cooling device as set forth in claim 19, wherein each of said plurality of fins includes a plurality of orifices spaced along its length.

* * * * *